Aug. 4, 1959     C. E. ROESSLER, JR     2,898,419
PRINTED CIRCUIT DIGITAL READ-OUT MECHANISM FOR WEIGHING SCALES
Filed Dec. 6, 1957     2 Sheets-Sheet 1
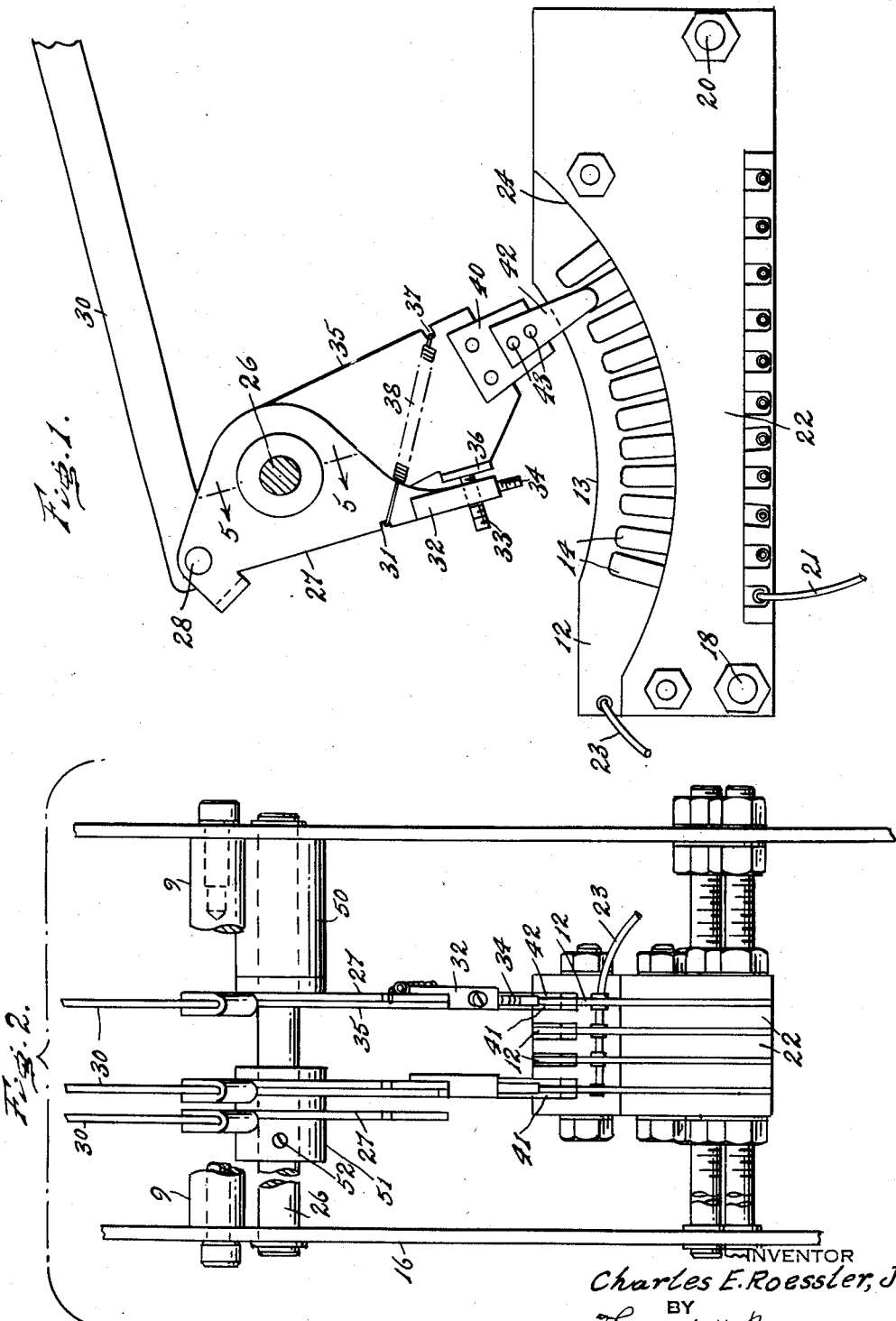
INVENTOR
Charles E. Roessler, Jr.
BY
Frank H. Borden
ATTORNEY 
United States Patent Office

2,898,419
Patented Aug. 4, 1959

2,898,419

PRINTED CIRCUIT DIGITAL READ-OUT MECHANISM FOR WEIGHING SCALES

Charles E. Roessler, Jr., Rutland, Vt., assignor to The Howe Scale Company, Rutland, Vt., a corporation of Delaware Application December 6, 1957, Serial No. 701,091

4 Claims. (Cl. 200—85)

This invention relates to a printed circuit digital read-out mechanism for weighing scales.

The primary object of the invention is to simplify and cheapen the switching organization of a read-out system in an analogue digital converter for weighing scales. Other objects and advantages will become more apparent as the description proceeds.

In the accompanying drawings forming part of this description:

Fig. 1 represents a fragmentary side elevation of a mounted contact block and the complemental wiping contact element straddling same, with part of the actuating linkage disclosed.

Fig. 2 represents a fragmentary plan of the switching organization with certain contact blocks and complemental wiping contact elements removed, for clarity.

Figure 3:
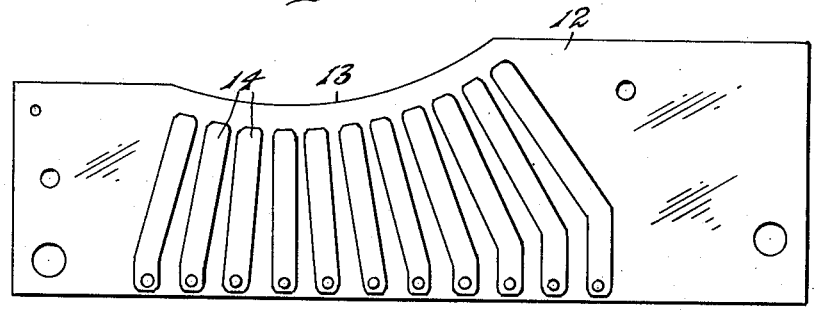
Fig. 3 represents a side elevation of a contact block according to the invention, showing the individual contacts of the circuit controller on one side thereof.
Figure 4:
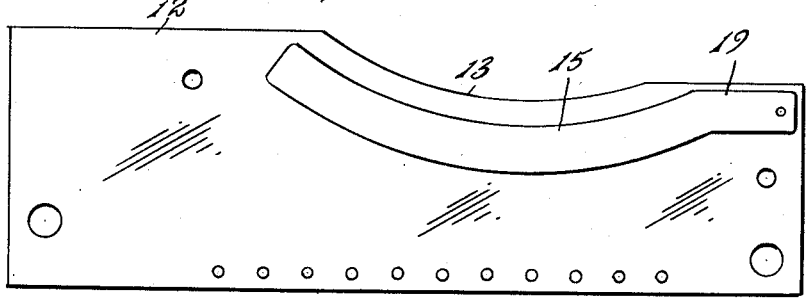
Fig. 4 represents a side elevation of the other side of the contact block of Fig. 3, showing the common contact thereon.

The invention is particularly applicable to weighing scales, such as have auxiliary printing mechanisms. In such organizations cam wheels or the like are positioned in accordance with attained weight on the scale, and printing wheels or segments are positioned by linkage controlled by the respective cam wheels.

In carrying out the invention in an illustrative embodiment, the type wheels or segments are removed, and replaced by the switching mechanism to be described. On the other hand the switching can be provided as a supplement to printing. It will be understood that there will be as many stationary contact blocks as there are digits to be read out. Let it be assumed for illustrative purposes that there are four digits involved, respectively units, tens, hundreds and thousands, and that each digit is divided into 10 numerals, respectively from 0 to 9. In the instant case it is preferred to provide an extra contact for other purposes.

A contact block 12 is provided, comprising a relatively thin block of insulation material, of generally relatively large rectangular outline at one end and a generally smaller rectangular outline at the other end, with the upper surface or edge of the block formed on an arc connecting the end portions. The arc 13 is generated about an axis to be described. The block is suitably apertured for mounting and establishing electrical connections to be described, and on one face has printed, or otherwise superficially applied, a plurality of individual contacts 14, the upper free ends of which lie in an arc concentric with the arcuate edge 13. The opposite face of said block has printed or otherwise superficially applied a common contact 15 having an arcuate extent concentric with the edge 13, and a forward extension 19.

A frame is provided comprising side plates 16 and 17 connected by cross bolts 9, 18 and 20. The blocks have their respective contacts 14 suitably individually wired, as by wires 21 (of which but one is shown but which will be duplicated for each terminal or contact), and the blocks are mounted on the respective bolts 18 and 20, suitably spaced by spacers 22, and are cut away on their upper edges in arcuate surfaces 24. A common lead or connector 23 passes through the spacers and blocks to establish electrical connection with the respective forward extensions 19 of each common lead 15.

A shaft 26 is journalled in the side plates 16 and 17, and journals a plurality of preferably flanged hubs in axial relative abutment on the shaft. While these hubs may be separate annular members it is preferred that they comprise hub extensions of type sectors so that printing and digital read-out are accomplished in synchronism, by the common control instrumentality. By means of these hubs an illustrative four compound levers are journalled for oscillation relative to said shaft. The compound levers are held in proper lateral spacing by the hubs and spacing bushing 50, and anchoring bushing 51, secured to the shaft 26 by set screw 52. Each compound lever comprises a main lever 27 suitably secured to the flange of the juxtaposed hub and pivoted at its upper end at 28 to an actuating link 30, the free outer end of which is controlled by its respective cam wheel (not shown). The lower arm of the lever 27 is notched or recessed on its front edge as at 31, and at its extreme lower end mounts a block 32 suitably apertured as to rigidly, but adjustably, carry a stop screw 33, anchored in an adjusted position by a set screw 34. The other portion of the compound lever comprises a contact-making member formed of a plate 35, journalled on the juxtaposed hub adjacent to the main lever secured to its flange. The front edge of the plate 35 has a transverse flange 36 juxtaposed to the stop screw 33 to abut same. The rear edge of the plate 35 is notched as at 37, and a tension spring 38 engages between the lever notch 31 and the contact plate notch 37 to hold the flange 36 in engagement with the end of the stop screw in all positions of adjustments of the latter. At its lower edge the plate member 35 carries a block of insulation material 40. Opposing spring fingers 41 and 42 are mounted on the insulation block in mutual electrical engagement, as by rivets or the like 43, passing through the insulation block. The spring contact fingers have an initial bias toward each other.

The respective compound levers are so spaced on the shaft 26 that the respective contact blocks 12 substantially bisect the spring contact fingers 41 and 42. The latter are so disposed as to straddle the respective blocks 12 and physically embrace the opposite faces thereof, so as to respectively simultaneously engage and make contact with an instant terminal or contact 14 and the common contact 15.

It will be seen that actuation of the respective links 30 in response to cam wheel setting will, yieldably by spring 38, cause the contact fingers 41 and 42 to wipe both sides of the contact block and transmit a signal across the instant connector 21 and the common connector 23.

Figure 5:
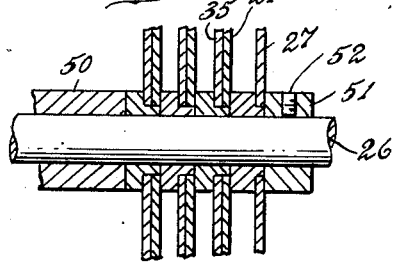
Fig. 5 represents a fragmentary section taken on line 5—5 of Fig. 1.

If desired an additional link 30 and lever 27 may be provided on a hub on the shaft 26 for additional control purposes, as indicated in Figs. 2 and 5.

I claim as my invention:

1. In weighing scales, a shaft, a main lever journalled for oscillation relative to said shaft, a link pivoted to the main lever and having generally axial motion functional with weight attained on an associated scale, a plate journalled for oscillation relative to said shaft adjacent to said main lever, a spring extending between the lever and the plate urging the latter angularly toward said lever to yieldably follow the main lever in one direction of its oscillations in response to motion of said link, a wiping contact element mounted on said plate comprising resilient opposing contact fingers, a sheet of insulating material mounted to be straddled by the fingers of said element, a plurality of metallic contacts on one face of said sheet, a common metallic contact on the other face of said sheet, whereby under the yielding urge of said spring movement of said main lever to a given position pursuant to link motion closes a circuit between a selected contact of said plurality and said common contact between said fingers.

2. Weighing scales as in claim 1 and adjustable stop means between said main lever and said plate for controlling the relation of said plate to said link.

3. Weighing scales as in claim 1 in which the main lever is secured to the flange of a flanged hub oscillatable on said shaft, and said plate is journalled on said hub.

4. Weighing scales as in claim 3 in which said hub is part of a type sector whereby synchronously the type sector and the wiping contact element are positioned by said link.

References Cited in the file of this patent

UNITED STATES PATENTS

| | | |
|---|---|---|
| 2,503,295 | Palmer | Apr. 11, 1950 |
| 2,599,953 | Summers | June 10, 1952 |
| 2,616,994 | Luhn | Nov. 4, 1952 |
| 2,649,513 | Luhn | Aug. 18, 1953 |